(12) United States Patent
Kihara

(10) Patent No.: US 8,289,871 B2
(45) Date of Patent: Oct. 16, 2012

(54) PROPAGATION DELAY TIME MEASURING SYSTEM

(75) Inventor: Masami Kihara, Tokyo (JP)

(73) Assignee: Nihon University, Tokyo (JP)

( * ) Notice: Subject to any disclaimer, the term of this patent is extended or adjusted under 35 U.S.C. 154(b) by 340 days.

(21) Appl. No.: 12/602,093

(22) PCT Filed: Dec. 25, 2007

(86) PCT No.: PCT/JP2007/074831
§ 371 (c)(1),
(2), (4) Date: Nov. 25, 2009

(87) PCT Pub. No.: WO2008/146427
PCT Pub. Date: Dec. 4, 2008

(65) Prior Publication Data
US 2010/0195517 A1    Aug. 5, 2010

(30) Foreign Application Priority Data
May 28, 2007    (JP) .................... 2007-140083

(51) Int. Cl.
*H04J 3/14* (2006.01)
(52) U.S. Cl. ...................................... 370/252
(58) Field of Classification Search ............ 370/229, 370/230, 231, 232, 233, 234, 235, 241, 242, 370/248, 249, 252
See application file for complete search history.

(56) References Cited

U.S. PATENT DOCUMENTS 5,450,394 A * 9/1995 Gruber et al. ................ 370/253
8,059,675 B1 * 11/2011 Cook ........................... 370/464
2003/0123491 A1 * 7/2003 Couillard ..................... 370/508
2005/0088996 A1 4/2005 Kawamura et al.
2008/0049633 A1 * 2/2008 Edwards et al. ............. 370/252

FOREIGN PATENT DOCUMENTS

JP    2001111618 A    4/2001
JP    2005130256 A    5/2005

OTHER PUBLICATIONS

Takahiro Yagi et al., "A new approach for measuring the bottleneck link bandwidth using probe packets", Information Processing Society of Japan Kenkyu Hokoku (Josho Kenpo) 2003-QAI-6-17, Feb. 7, 2003. (Relevance satisfied by attached Search Report).

Takahiro Yagi et al., "A new technique for estimating bottleneck-link bandwidth using UDP pair packets", The Institute of Electronics Information and Communication Engineers(IEICE) Technical Report, IN2003-92, Oct. 10, 2003. (Relevance satisfied by attached Search Report).

* cited by examiner

*Primary Examiner* — Obaidul Huq
(74) *Attorney, Agent, or Firm* — Ohlandt, Greeley, Ruggiero & Perle, L.L.P.

(57) ABSTRACT

A propagation delay time measuring system 100 includes a propagation delay time measuring apparatus 110 and a reply apparatus 120. The propagation delay time measuring apparatus 110 continuously transmits plural measuring packets a. A clock time of transmission is stored in the measuring packet a. The reply apparatus 120 sends back the measuring packets a, transmitted from the propagation delay time measuring apparatus 110, to the propagation delay time measuring apparatus 110. In the propagation delay time measuring system 100, the propagation delay time measuring apparatus 110 receives the measuring packets a sent back from the reply apparatus 120, and the propagation delay time measuring apparatus 110 measures a propagation delay time between the propagation delay time measuring apparatus 110 and the reply apparatus 120 using at least one of the received measuring packets a.

2 Claims, 16 Drawing Sheets

PROPAGATION DELAY TIME DISTRIBUTION FOR TWO MEASURING PACKETS

PEAK VALUE OF PROPAGATION DELAY TIME (μs)

PROPAGATION DELAY TIME DISTRIBUTION FOR THREE MEASURING PACKETS

PROPAGATION DELAY TIME DISTRIBUTION FOR FOUR MEASURING PACKETS

PROPAGATION DELAY TIME DISTRIBUTION FOR FIVE MEASURING PACKETS

PEAK VALUE OF PROPAGATION DELAY TIME (μs)

PROPAGATION DELAY TIME DISTRIBUTION FOR TEN MEASURING PACKETS

PEAK VALUE OF PROPAGATION DELAY TIME (μs)

INTER-PACKET PROPAGATION
DELAY TIME DIFFERENCE

INTER-PACKET PROPAGATION
DELAY TIME DIFFERENCE

FIG. 18

| m | Δt1 | Δt2 | Δt3 | POINT |
|---|---|---|---|---|
| PROPAGATION DELAY TIME Δt1 | ○ | × | ○ | 2 |
| PROPAGATION DELAY TIME Δt2 | ○ | ○ | × | 1 |
| PROPAGATION DELAY TIME Δt3 | ○ | × | ○ | 2 |

PROPAGATION DELAY TIME MEASURING SYSTEM

CROSS REFERENCE TO PRIOR APPLICATIONS

This application is the U.S. National Phase application under 35 U.S.C. §371 of International Application No. PCT/JP2007/074831, filed Dec. 25, 2007, and claims benefit to Japanese Patent Application No. 2007-140083, filed May 28, 2007. The International Application was published in Japanese on Dec. 4, 2008 as WO 2008/146427 under PCT Article 21(2).

FIELD

The present invention relates to a propagation delay time measuring system that measures a time taken for a repetition of a packet.

BACKGROUND

Conventionally, a propagation delay time is measured in a communication network for the purpose of maintenance and management of the communication network or positioning with a mobile telephone (for example, see Japanese Patent Application Laid-Open No. 2005-130256).

FIG. 4 is a schematic diagram illustrating a conventional method for measuring the propagation delay time. In a communication network 200, a server 210 transmits a measuring packet a to a client 220. Then the client 220 that receives the measuring packet a sends back the measuring packet a to the server 210, the server 210 receives the sent-back measuring packet a, and the propagation delay time of the communication network 200 can be measured from the time taken for a repetition of the measuring packet a.

SUMMARY OF INVENTION

However, in the conventional propagation delay time measuring method, the propagation delay time depends on a load on and a processing status of a network repeater (not illustrated) such as a router connected to the communication network 200, which causes a problem in that the propagation delay time fluctuates largely according to transmission timing of the measuring packet a. The problem is generated even in a small amount of traffic of the communication network 200. The fluctuation in the propagation delay time is increased when the transmission timing of the measuring packet a is deviated in order to reduce an influence on data transmission and reception of the communication network 200.

The problem will specifically be described below. FIG. 5 illustrates a relationship of the propagation delay time between the server and the client in the communication network. An upper stage of FIG. 5 indicates a time axis of the server, and a lower stage of FIG. 5 indicates a time axis of the client. In FIG. 5, times is to ts1 and times tr1 to tr express a measuring packet processing time in the server, and times tr2 to ts2 express a measuring packet processing time in the client. The measuring packet processing times depend on the measuring packet transmission timing. Therefore, in the measured propagation delay time, not only a distribution is changed, but also an absolute value is changed. FIG. 6 illustrates an example of the change of the propagation delay time distribution in the communication network.

It is preferable that the measuring packet be transmitted while the amount of traffic of the communication network is measured such that the data transmission and reception of the communication network are not influenced. Generally, in the communication network, accuracy of the propagation delay time is enhanced as the amount of traffic is lowered. Because the propagation delay time fluctuates depending on a jitter generated by a digital circuit of the network repeater or a buffer memory of the network repeater, it is preferable to measure the propagation delay time plural times to perform a statistical procedure. At this point, when the amount of traffic of the communication network fluctuates to change the measuring packet transmission timing, the measured propagation delay time also fluctuates largely.

In view of the foregoing, an aspect of the present invention is to provide a propagation delay time measuring system that can accurately measure the propagation delay time.

Specifically, in accordance with an aspect of the present invention, a propagation delay time measuring system includes a propagation delay time measuring apparatus that continuously transmits plural measuring packets, a clock time of transmission being stored in the measuring packet; and a reply apparatus that sends back the measuring packets, transmitted from the propagation delay time measuring apparatus, to the propagation delay time measuring apparatus, wherein the propagation delay time measuring apparatus receives the measuring packets sent back from the reply apparatus, and the propagation delay time measuring apparatus measures a propagation delay time between the propagation delay time measuring apparatus and the reply apparatus using at least one of the received measuring packets.

The propagation delay time measuring system of the aspect of the present invention can accurately measure the propagation delay time.

In the propagation delay time measuring system according to another aspect of the present invention, preferably the reply apparatus sends back only the measuring packet, which is received within a predetermined time since the last measuring packet is received, to the propagation delay time measuring apparatus.

In the propagation delay time measuring system of the aspect of the present invention, the propagation delay time can accurately be measured.

In the propagation delay time measuring system according to another aspect of the present invention, preferably the propagation delay time measuring apparatus measures the propagation delay time using only the measuring packet that is received within the predetermined time since the last measuring packet is received.

The propagation delay time measuring system of the aspect of the present invention can enhance the accuracy of the propagation delay time.

In the propagation delay time measuring system according to another aspect of the present invention, preferably the propagation delay time measuring apparatus measures the propagation delay time using the n-th measuring packet in the received measuring packets (where $2 \leq n \leq$ the number of continuously-transmitted measuring packets).

In the propagation delay time measuring system of the aspect of the present invention, the propagation delay time can accurately be measured.

In the propagation delay time measuring system according to another aspect of the present invention, preferably the propagation delay time measuring apparatus measures the propagation delay time using all the n-th or later measuring packets in the received measuring packets (where $2 \leq n \leq$ the number of continuously-transmitted measuring packets).

In the propagation delay time measuring system of the aspect of the present invention, the propagation delay time can accurately be measured.

In the propagation delay time measuring system according to another aspect of the present invention, preferably the propagation delay time measuring apparatus transmits the m measuring packets (where 3≦m≦the number of continuously-transmitted measuring packets), measures the propagation delay time using the received measuring packets, and computes an inter-packet propagation delay time difference obtained by a difference between the measured propagation delay times.

When a delay is generated in the propagation delay time by cross traffic, the inter-packet propagation delay time difference deviates from near zero. The measuring packet in which the cross traffic is not generated can be extracted by determining the common propagation delay time shared by the combinations whose inter-packet propagation delay time differences become near zero. Therefore, the stable propagation delay time that is not influenced by the cross traffic can be measured, and the threshold for determining whether the cross traffic is generated can be centered around zero.

In the propagation delay time measuring system according to the aspect of the present invention, preferably the value of m is variable in the propagation delay time measuring apparatus.

The total number of combinations of propagation delay times is increased with increasing value of m. The variable total number of combinations of propagation delay times can reduce the influence of the cross traffic.

In the propagation delay time measuring system according to another aspect of the present invention, preferably the propagation delay time measuring apparatus obtains the value of m in which the inter-packet propagation delay time difference concentrates on zero, and the propagation delay time measuring apparatus computes the inter-packet propagation delay time difference using the value of m.

The number of combinations of propagation delay times whose inter-packet propagation delay time differences become near zero is increased with increasing the total number of combinations of propagation delay times. The inter-packet propagation delay time difference is computed using the value of m in which the inter-packet propagation delay time difference concentrates on near zero. Therefore, the propagation delay time which is less influenced by the cross traffic can be measured.

The present invention can provide the propagation delay time measuring system that can accurately measure the propagation delay time.

BRIEF DESCRIPTION OF DRAWINGS

FIG. 17($b$) is a graph illustrating the distribution of the inter-packet propagation delay time difference $\Delta BB$ when the cross traffic is generated.

FIG. 18 is an explanatory view illustrating an example of a method for extracting a propagation delay time that is influenced by a delay due to cross traffic and the like.

DETAILED DESCRIPTION

Figure 1:
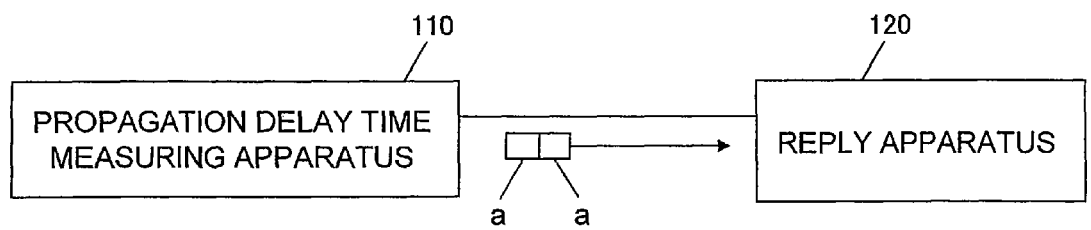
FIG. 1 is a schematic diagram illustrating a propagation delay time measuring system according to an embodiment of the present invention.

Embodiments of the present invention will specifically be described in detail below. However, the present invention is not limited to the following embodiments. In the following description, the same component is designated by the same reference numeral.

FIG. 1 is a schematic diagram illustrating a propagation delay time measuring system according to an embodiment of the present invention. A propagation delay time measuring system 100 of an embodiment includes a propagation delay time measuring apparatus 110 and a reply apparatus 120. The propagation delay time measuring apparatus 110 continuously transmits plural measuring packets a in which clock times of transmission are stored. The reply apparatus 120 sends the measuring packets a transmitted from the propagation delay time measuring apparatus 110 back to the propagation delay time measuring apparatus 110. The propagation delay time measuring apparatus 110 receives the measuring packets a sent back from the reply apparatus 120, and the propagation delay time measuring apparatus 110 measures a propagation delay time between the propagation delay time measuring apparatus 110 and the reply apparatus 120 using at least one of the received measuring packets a.

Examples of the propagation delay time measuring apparatus 110 include a server, a work station, or a host computer. Although not illustrated, the propagation delay time measuring apparatus 110 includes an arithmetic device such as CPU, a storage unit such as a memory and a hard disk drive, input and output units such as a mouse, a keyboard, a display, and a printer, and a communication interface such as a LAN port. The propagation delay time measuring apparatus 110 may have a function of measuring the propagation delay time, and plural pieces of propagation delay time measuring apparatus 110 may be used.

Examples of the reply apparatus 120 include a personal computer, a work station, or a host computer. The reply apparatus 120 includes the arithmetic device, the storage unit, the input and output units, and the communication interface, for example.

In an embodiment of FIG. 1, the propagation delay time measuring apparatus 110 and the reply apparatus 120 are connected one-on-one. In the propagation delay time measuring system 100, plural pieces of reply apparatus 120 may be connected to one propagation delay time measuring apparatus 110. At this point, the propagation delay time measuring system 100 can measure the propagation delay time between the propagation delay time measuring apparatus 110 and each piece of reply apparatus 120.

A clock time of transmission at the propagation delay time measuring apparatus 110 is stored in the measuring packet a. When the propagation delay time measuring system 100 uses TCP/IP, for example, a clock time of transmission, an identification number, a port number, an IP address of the propagation delay time measuring apparatus 110, and an IP address of the reply apparatus 120 are stored in the measuring packet a. The propagation delay time measuring apparatus 110 can measure the propagation delay time from a difference between the clock time of transmission of the measuring packet a and the clock time the sent-back measuring packet a is received. Preferably the reply apparatus 120 records a clock time of reply in the measuring packet a when sending back the measuring packet a. The propagation delay time measuring system 100 can measure the propagation delay time of an outward path from the propagation delay time measuring apparatus 110 to the reply apparatus 120 and the propagation delay time of an inward path from the reply apparatus 120 to the propagation delay time measuring apparatus 110. Data may be stored in the measuring packet a.

Figure 7:
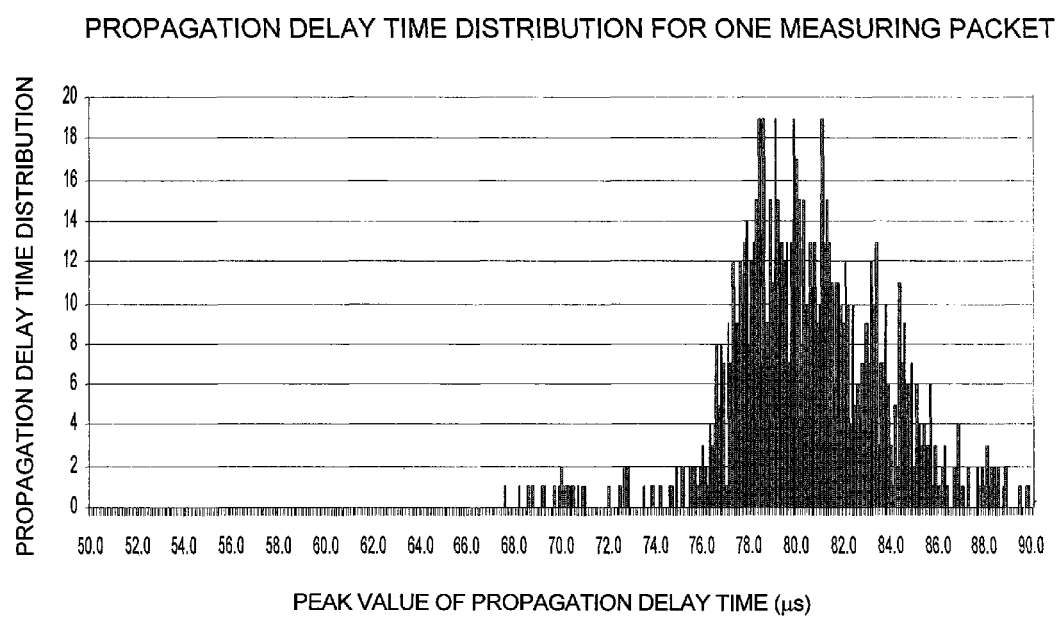
FIG. 7 is a graph illustrating a relationship between a peak value of the propagation delay time and the propagation delay time distribution when one measuring packet is transmitted.
Figure 8:
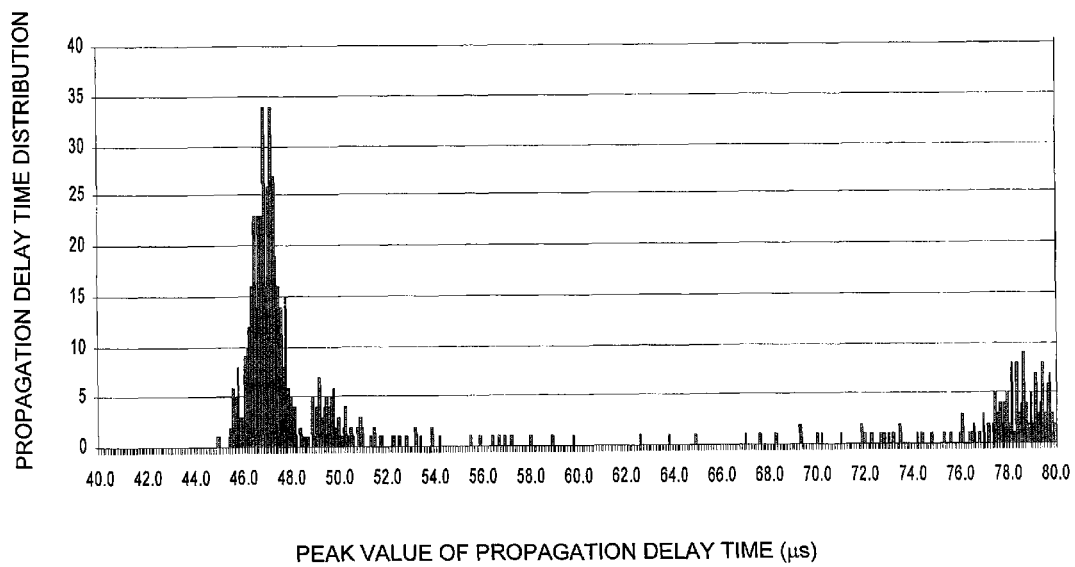
FIG. 8 is a graph illustrating a relationship between the peak value of the propagation delay time and the propagation delay time distribution when two measuring packets are continuously transmitted.
Figure 9:
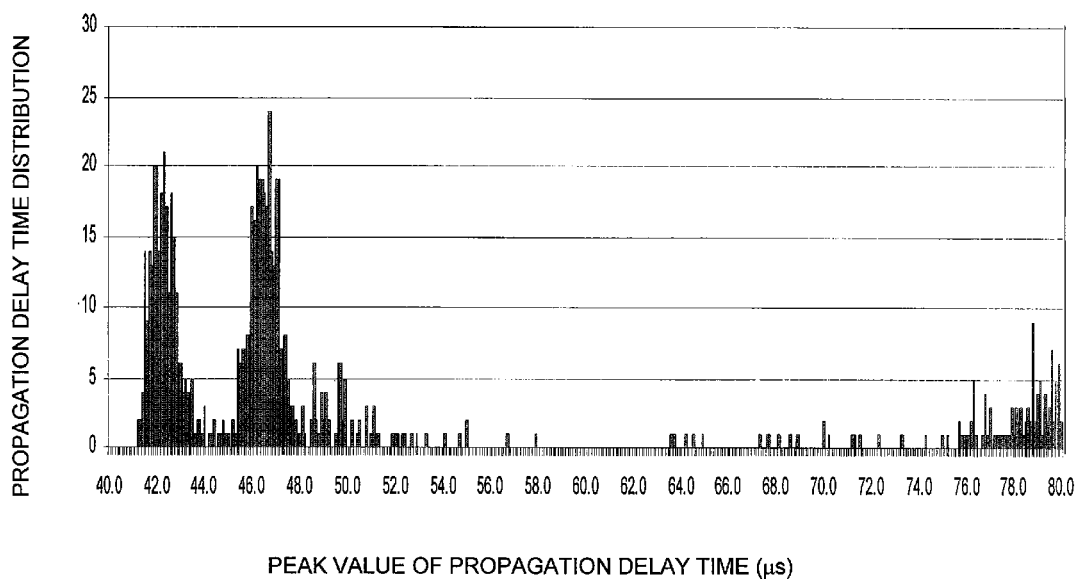
FIG. 9 is a graph illustrating a relationship between the peak value of the propagation delay time and the propagation delay time distribution when three measuring packets are continuously transmitted.
Figure 10:
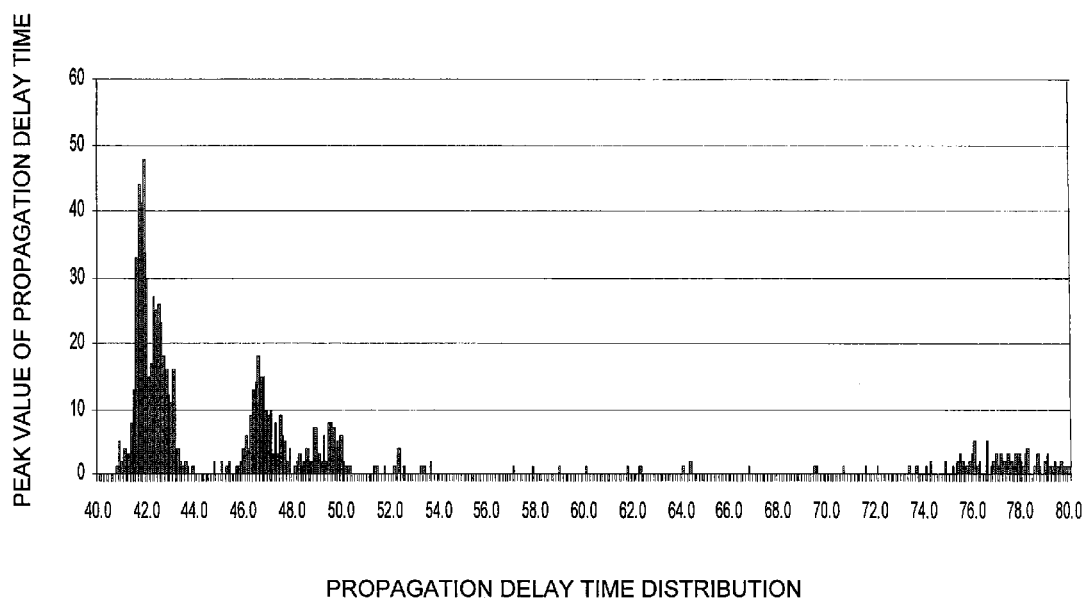
FIG. 10 is a graph illustrating a relationship between the peak value of the propagation delay time and the propagation delay time distribution when four measuring packets are continuously transmitted.
Figure 11:
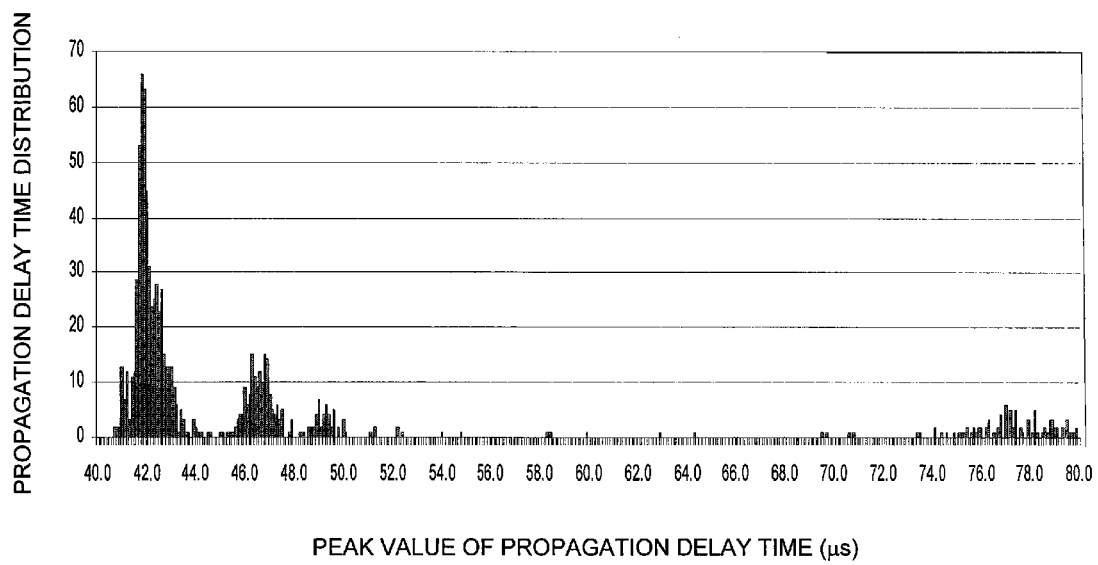
FIG. 11 is a graph illustrating a relationship between the peak value of the propagation delay time and the propagation delay time distribution when five measuring packets are continuously transmitted.
Figure 12:
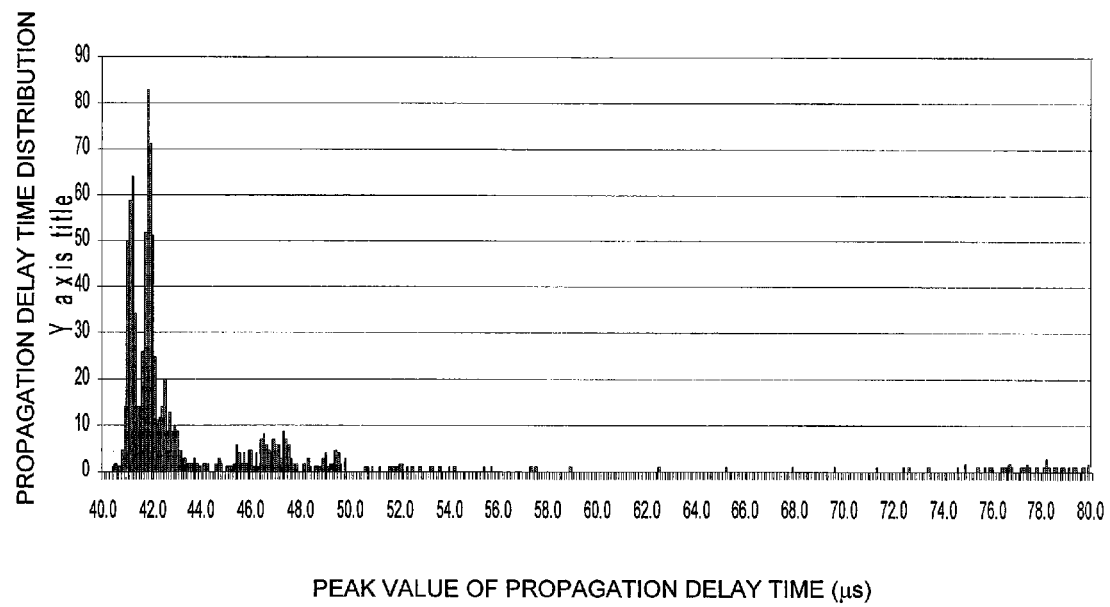
FIG. 12 is a graph illustrating a relationship between the peak value of the propagation delay time and the propagation delay time distribution when ten measuring packets are continuously transmitted.
Figure 13:
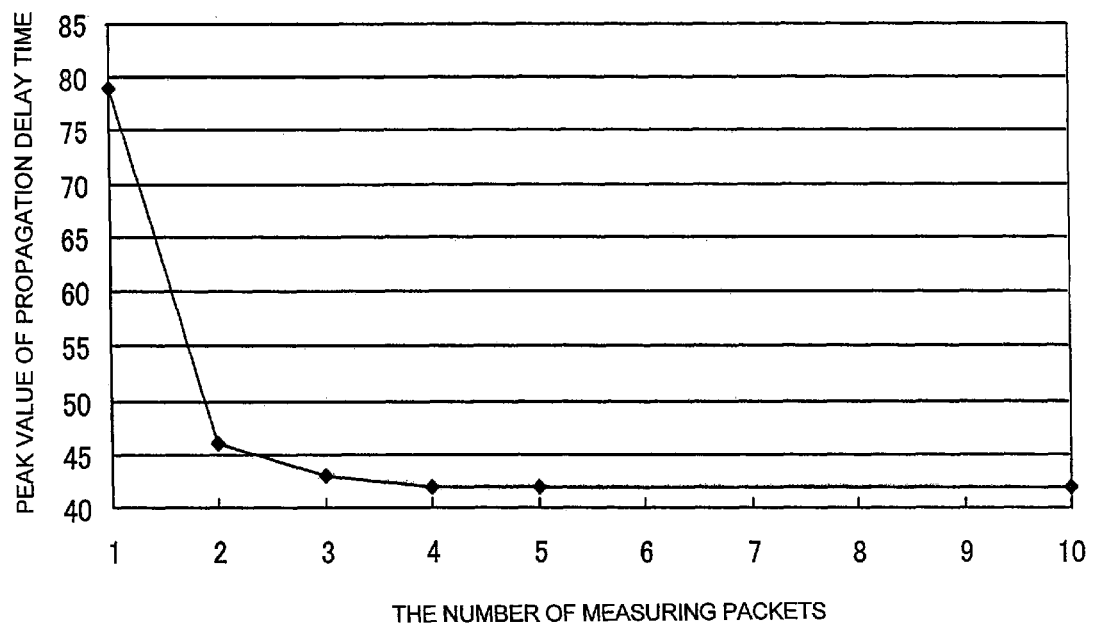
FIG. 13 is a graph illustrating a relationship between the number of transmitted measuring packets and the peak value of the propagation delay time.
Figure 14:
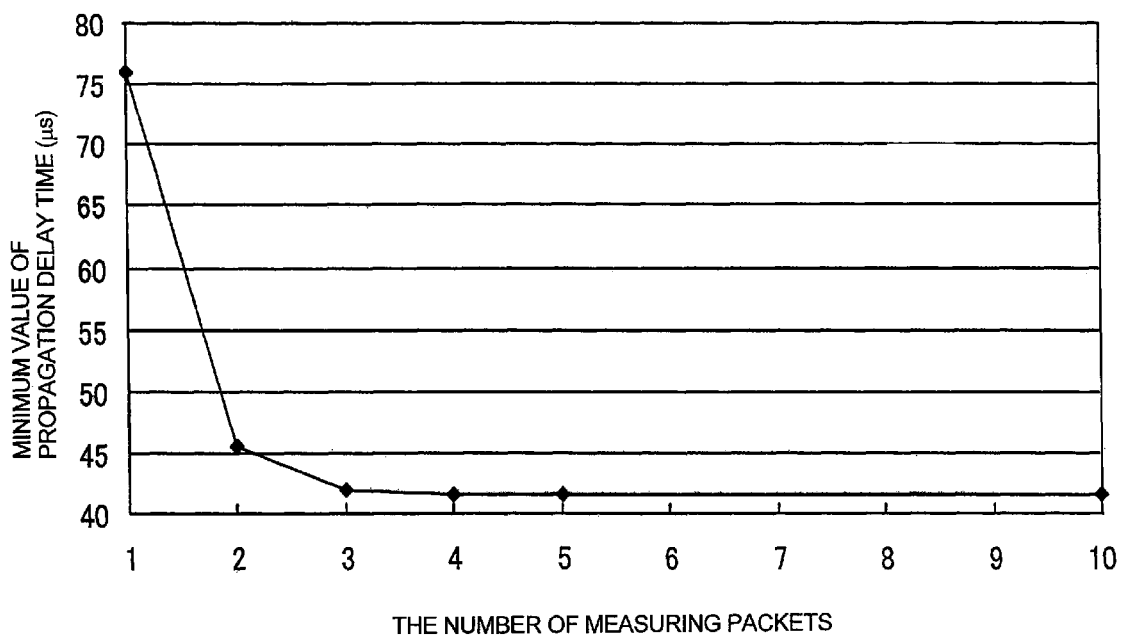
FIG. 14 is a graph illustrating a relationship between the number of transmitted measuring packets and a minimum value of the propagation delay time.

In FIG. 1, the propagation delay time measuring apparatus 110 continuously transmits the two measuring packets a. FIG. 7 illustrates a relationship between a peak value of the propagation delay time and a propagation delay time distribution when one measuring packet is transmitted. FIGS. 8 to 12 illustrate relationships between the peak values of the propagation delay times and the propagation delay time distributions when two, three, four, five, and ten measuring packets are continuously transmitted, respectively. As can be seen from FIGS. 7 to 12, when the number of continuously-transmitted measuring packets is increased, the propagation delay time distribution is narrowed and stabilized. FIG. 13 illustrates a relationship between the number of transmitted measuring packets and the peak value of the propagation delay time. FIG. 14 illustrates a relationship between the number of transmitted measuring packets and a minimum value of the propagation delay time. As can be seen from FIGS. 13 and 14, the peak value and minimum value of the propagation delay time become the minimum when the number of transmitted measuring packets ranges from three to five. Therefore, preferably the three to five measuring packets are continuously transmitted, and more preferably three measuring packets are continuously transmitted. Obviously at least five measuring packets a may continuously be transmitted.

In the propagation delay time measuring apparatus 110 of FIG. 1, the clock time the measuring packet a is transmitted is recorded as the clock time of transmission in the measuring packet a. The propagation delay time measuring apparatus 110 can measure the propagation delay time from the difference between the clock time of transmission of the measuring packet a and the clock time the sent-back measuring packet a is received. When the plural measuring packets a are continuously transmitted, the propagation delay time measuring system 100 can accurately measure the propagation delay time with a minimum of fluctuation of the propagation delay time distribution, caused by a change of transmission timing of the measuring packet a. The propagation delay time measuring system 100 can also eliminate a trouble of monitoring and controlling the transmission timing of the measuring packet a.

Usually a network repeater (not illustrated) includes a buffer memory in which the relayed measuring packet a or data is temporarily stored. The storage of the measuring packet a in the buffer memory delays the time the measuring packet reaches the reply apparatus 120, and the propagation delay time largely fluctuates meantime. The reason that the accuracy of measured propagation delay time is enhanced by continuously transmitting the plural measuring packets a will be described below. Even if the measuring packet a is stored in the buffer memory, the buffer memory tends to overflow because of the continuous measuring packets a. Therefore, it is speculated that the network repeater can immediately transmit the measuring packet a stored in the buffer memory to extremely shorten the time during which the measuring packet a is stored in the buffer memory in order to secure a free space of the buffer memory. That is, the propagation delay time measuring system 100 continuously transmits the plural measuring packets a such that the measuring packet a is not stored in the buffer memory or such that the measuring packet a is stored only for an extremely short time, which allows the propagation delay time to be accurately measured.

In the propagation delay time measuring system 100 of an embodiment, preferably the propagation delay time measuring apparatus 110 measures the propagation delay time using an n-th measuring packet a in the received measuring packets a (where $2 \leq n \leq$ the number of continuously-transmitted measuring packets). More preferably the propagation delay time measuring apparatus 110 measures the propagation delay time using the finally-transmitted measuring packet a. For example, when the propagation delay time measuring apparatus 110 continuously transmits the three measuring packets a, the propagation delay time measuring apparatus 110 measures the propagation delay time using only the third measuring packet a. Usually the propagation delay time of the first measuring packet a has an accuracy lower than that of the propagation delay time of the second or later measuring packets a. The accuracy of the propagation delay time is enhanced as the measuring packet a is transmitted later. Therefore, the accuracy of the propagation delay time can be enhanced in the propagation delay time measuring system 100.

In the propagation delay time measuring system 100 of an embodiment, preferably the propagation delay time measuring apparatus 110 measure the propagation delay time using all the n-th or later measuring packets a in the received measuring packets a (where $2 \leq n \leq$ the number of continuously-transmitted measuring packets). For example, when the propagation delay time measuring apparatus 110 continuously transmits the five measuring packets a, the propagation delay time measuring apparatus 110 measures the propagation delay time using all the third or later measuring packets a. At this point, the propagation delay time measuring apparatus 110 may measure and average the propagation delay times of all the measuring packets a. The propagation delay time measuring apparatus 110 may be considered as the minimum propagation delay time in plural measuring packets a as the propagation delay time. The propagation delay time measuring apparatus 110 may be considered as the maximum propagation delay time in plural measuring packets a as the propagation delay time. The propagation delay time is measured using the plural measuring packets a, so that the propagation delay time measuring system 100 can enhance the accuracy of the propagation delay time.

Figure 2:
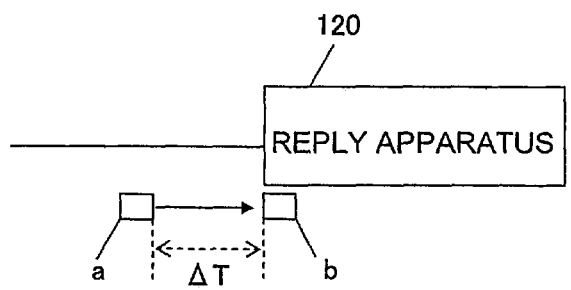
FIG. 2 is a schematic diagram illustrating a reply apparatus of the propagation delay time measuring system in accordance with an embodiment of the present invention.

FIG. 2 is a schematic diagram illustrating the reply apparatus of the propagation delay time measuring system. The reply apparatus 120 may send back the measuring packet a once reply apparatus 120 receives the measuring packet a. In the propagation delay time measuring system 100 of an embodiment, preferably the reply apparatus 120 sends back only the measuring packet a, which is received within a predetermined time since a last measuring packet b is received, to the propagation delay time measuring apparatus (not illustrated). In FIG. 2, the propagation delay time measuring apparatus transmits the two measuring packets, the reply apparatus 120 already receives the last measuring packet b, and the reply apparatus 120 is going to receive the second measuring packet a. In FIG. 2, a delay ΔT is a difference of the clock time of reception between the last measuring packet b and the measuring packet a.

For the small delay ΔT, the delay ΔT has a small influence on the measured propagation delay time. When the delay ΔT is increased, the delay ΔT degrades the accuracy of the measured propagation delay time. The measuring packet a is sent back to the propagation delay time measuring apparatus when the delay ΔT exists in a predetermined time. Therefore, in the propagation delay time measuring system 100, a variation in propagation delay time at the reply apparatus 120 can be reduced to enhance the accuracy of the propagation delay time.

For example, in the reply apparatus 120, the predetermined time ranges from one second to three seconds.

Figure 3:
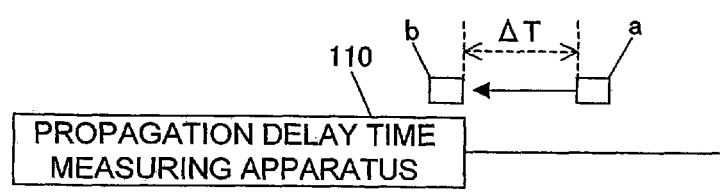
FIG. 3 is a schematic diagram illustrating a propagation delay time measuring apparatus of the propagation delay time measuring system in accordance with an embodiment of the present invention.
Figure 4:
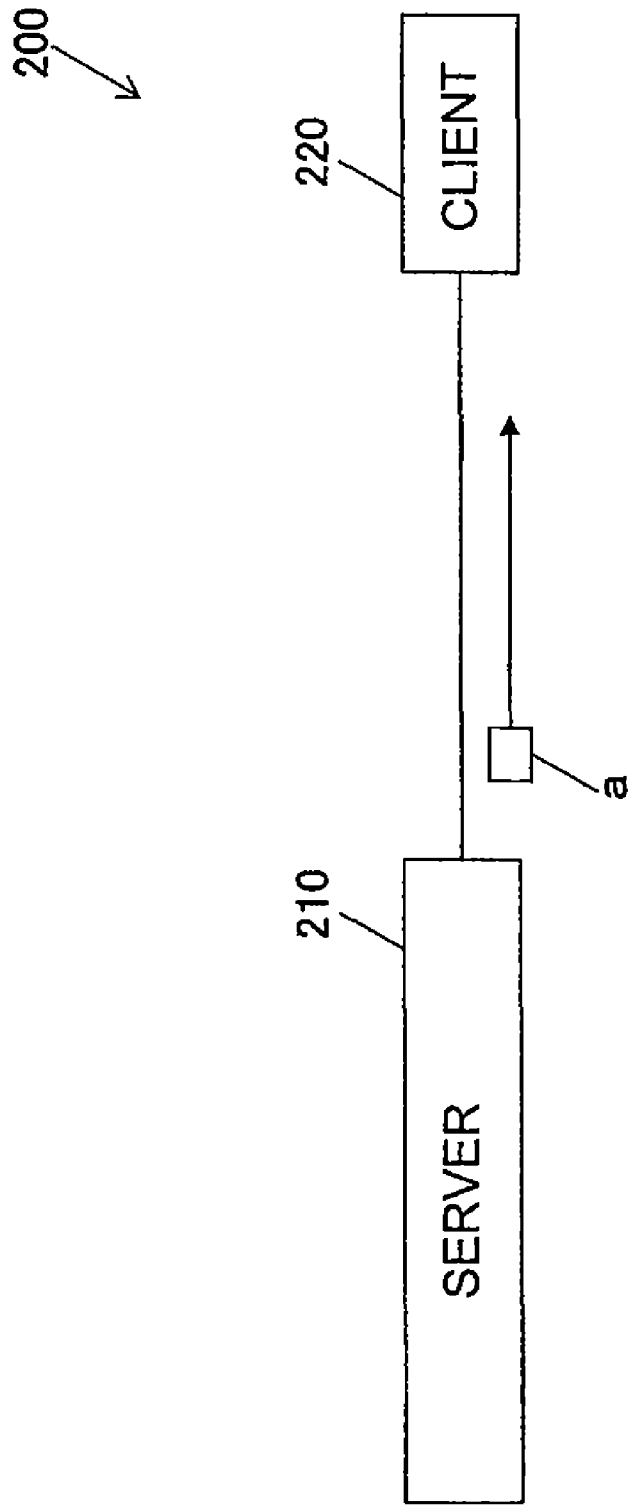
FIG. 4 is a schematic diagram illustrating a conventional method for measuring a propagation delay time.
Figure 5:
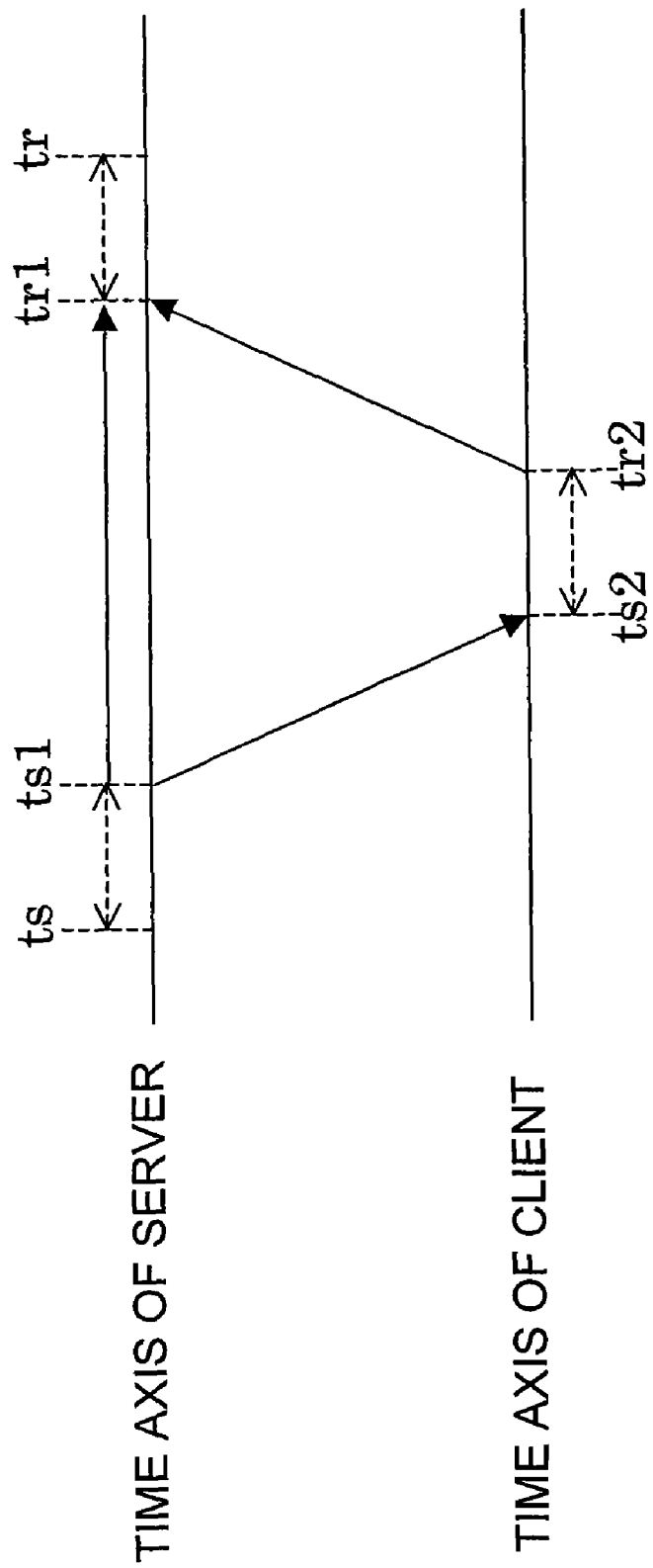
FIG. 5 is a view illustrating a relationship of the propagation delay time between a server and a client in a communication network.
Figure 6:
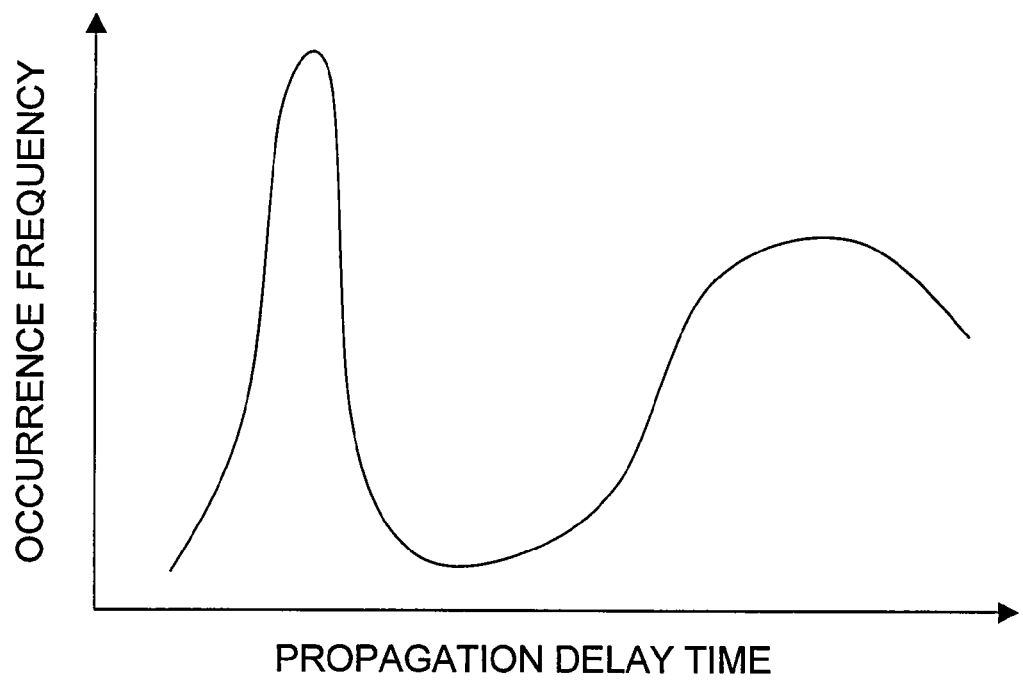
FIG. 6 is a graph illustrating an example of a change of a propagation delay time distribution in the communication network.

FIG. 3 is a schematic diagram illustrating the propagation delay time measuring apparatus of the propagation delay time measuring system. In the propagation delay time measuring system 100 of an embodiment, preferably the propagation delay time measuring apparatus 110 measures the propagation delay time using only the measuring packet a that is received within the predetermined time since the last measuring packet b is received. As with the reply apparatus 120 of FIG. 2, in the propagation delay time measuring system 100, the variation in propagation delay time measured by the reply apparatus 120 can be reduced to enhance the accuracy of the propagation delay time.

For example, in the propagation delay time measuring apparatus 110, the predetermined time ranges from one second to six seconds.

Figure 15:
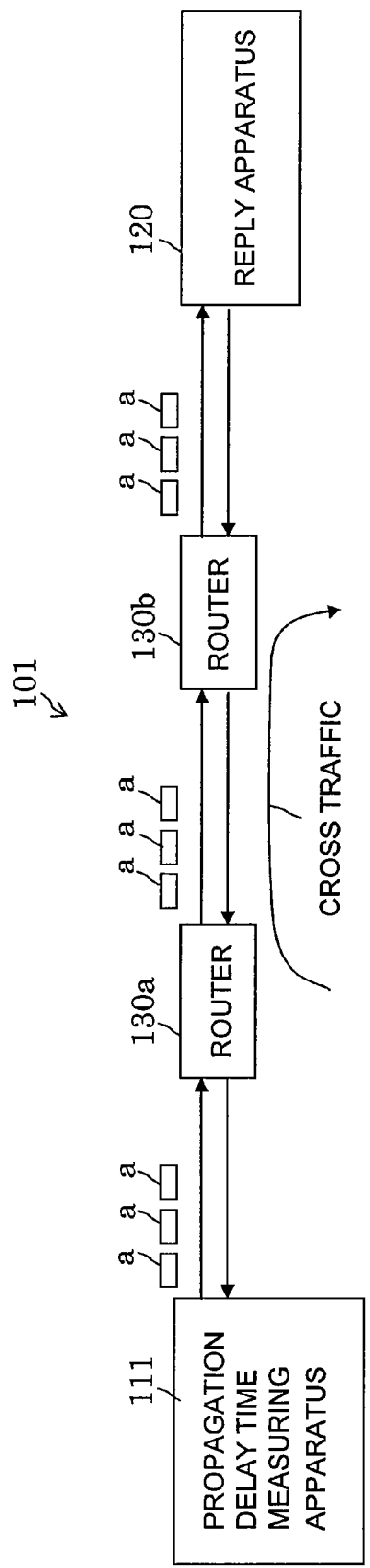
FIG. 15 is a schematic diagram illustrating a propagation delay time measuring system according to an embodiment of the present invention.

FIG. 15 is a schematic diagram illustrating a propagation delay time measuring system according to another embodiment of the invention. A propagation delay time measuring system 101 of another embodiment differs from the propagation delay time measuring system 100 illustrated in FIG. 1 of an embodiment in that routers 130a and 130b are disposed between the propagation delay time measuring apparatus 111 and the reply apparatus 120. As described in the propagation delay time measuring system 100, the propagation delay time measuring apparatus 111 and the reply apparatus 120 transmit and receive the measuring packet a through the routers 130a and 130b. At this point, the measuring packet a includes at least three continuous measuring packets.

In the propagation delay time measuring system 101, cross traffic is occasionally generated between the routers 130a and 130b. Therefore, for example, when cross traffic is generated in transmitting the measuring packet a, the propagation delay time of the measuring packet a is lengthened. The feature of the propagation delay time measuring apparatus 111 is that the influence of the cross traffic is removed in addition to the feature of the propagation delay time measuring apparatus 110 of FIG. 1. The propagation delay time measuring apparatus 111 will be described in detail below.

Figure 16:
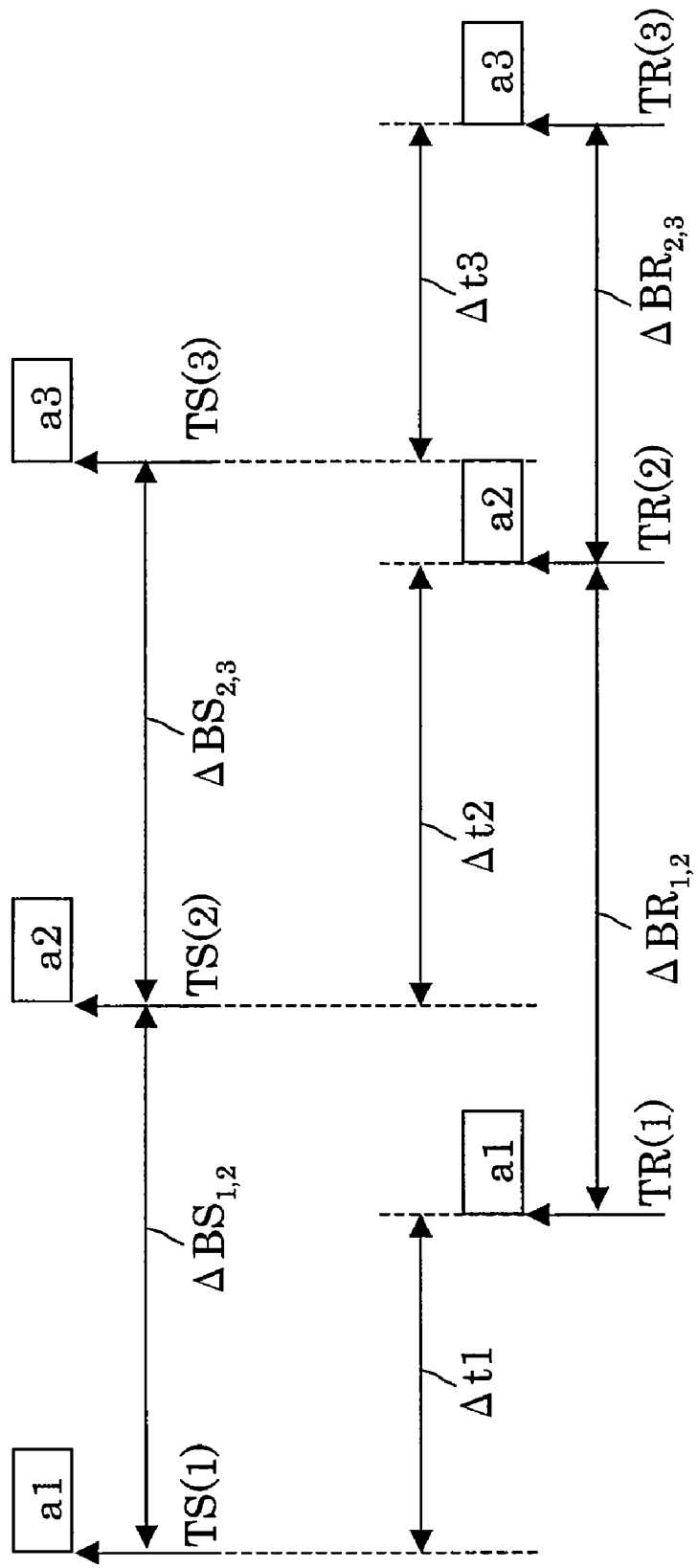
FIG. 16 is an explanatory view illustrating a measuring packet that is transmitted and received by the propagation delay time measuring apparatus in accordance with an embodiment of the present invention.

FIG. 16 is an explanatory view illustrating the measuring packet that is transmitted and received by the propagation delay time measuring apparatus. The propagation delay time measuring apparatus transmits and receives m measuring packets a1, a2, and a3. Where m is an integer which is at least three and is equal to or lower than the number of continuously-transmitted measuring packets. Although m is set to three in another embodiment, the effect that removes the influence of the cross traffic can further be enhanced when m is set to four or more.

The propagation delay time measuring apparatus measures the propagation delay time using the received measuring packets a1, a2, and a3. The clock times the propagation delay time measuring apparatus transmits the measuring packets a1, a2, and a3 are clock times TS(1), TS(2), and TS(3), respectively. The clock times the propagation delay time measuring apparatus receives the measuring packets a1, a2, and a3 are clock times TR(1), TR(2), and TR(3), respectively. At this point, a propagation delay time Δt1 of the measuring packet a1 is computed from "clock time TR(1)–clock time TS(1)". Similarly, the propagation delay time Δt2 of the measuring packet a2 and the propagation delay time Δt3 of the measuring packet a3 are computed for the measuring packets a2 and a3.

The propagation delay time measuring apparatus computes an inter-packet propagation delay time difference obtained from the difference between the measured propagation delay times. For example, an inter-packet propagation delay time difference $\Delta BB_{1,2}$ between the measuring packet a1 and the measuring packet a2 is computed from the computation of the difference between the propagation delay time Δt1 and the propagation delay time Δt2. Similarly an inter-packet propagation delay time difference $\Delta BB_{1,3}$ between the measuring packet a1 and the measuring packet a3 is computed from the computation of the difference between the propagation delay time Δt1 and the propagation delay time Δt3. An inter-packet propagation delay time difference $\Delta BB_{2,3}$ between the measuring packet a2 and the measuring packet a3 is computed from the computation of the difference between the propagation delay time Δt2 and the propagation delay time Δt3. The inter-packet propagation delay time differences $\Delta BB_{1,2}$, $\Delta BB_{1,3}$, and $\Delta BB_{2,3}$ are computed in each combination of propagation delay times.

The inter-packet propagation delay time differences $\Delta BB_{1,2}$, $\Delta BB_{1,3}$, and $\Delta BB_{2,3}$ are not limited to the computing procedure. For example, a time difference $\Delta BS_{1,2}$ between the clock time of transmission TS(1) of the measuring packet a1 and the clock time of transmission TS(2) of the measuring packet a2 is measured, and a time difference $\Delta TR_{1,2}$ between the clock time of reception TR(1) of the measuring packet a1 and the clock time of reception TR(2) of the measuring packet a2 is measured, whereby the inter-packet propagation delay time difference $\Delta BB_{1,2}$ can also be computed from the difference between the time difference $\Delta BS_{1,2}$ and the time difference $\Delta TR_{1,2}$. Unless a trouble such as the cross traffic is generated in the measuring packets a1, a2, a3, the inter-packet propagation delay time differences $\Delta BB_{1,2}$, $\Delta BB_{1,3}$, and $\Delta BB_{2,3}$ become zero.

Figure 17A:
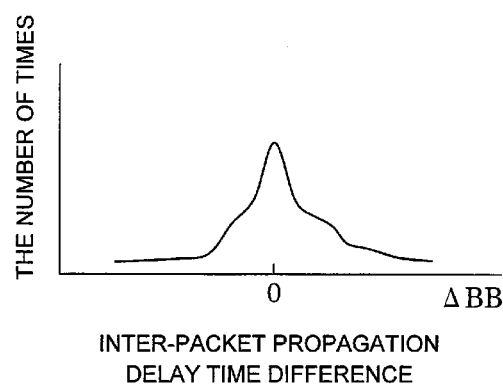
FIG. 17($a$) is a graph illustrating the distribution of the inter-packet propagation delay time difference $\Delta BB$ when the delay is generated in the network device such as the propagation delay time measuring apparatus and the reply apparatus.
Figure 17B:
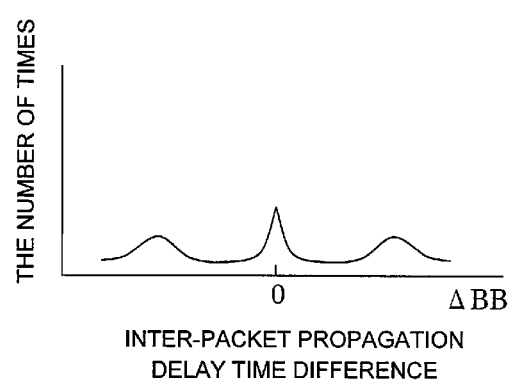

FIG. 17 illustrates an example of the distribution of the inter-packet propagation delay time difference. When the delay is generated in the network device such as the propagation delay time measuring apparatus and the reply apparatus, the distribution of the inter-packet propagation delay time difference $\Delta BB$ has an apex of zero as illustrated in FIG. 17(a). However, when the delay in the network device or the delay of the cross traffic is generated, the inter-packet propagation delay time difference $\Delta BB$ deviates from zero. The value of the inter-packet propagation delay time difference $\Delta BB$ is increased with increasing delay. For example, when the cross traffic is generated, the distribution of the inter-packet propagation delay time difference $\Delta BB$ also has other apexes located away from zero as illustrated in FIG. 17(b).

The propagation delay time that is not influenced by the cross traffic can be extracted by filtering the combination of propagation delay times in which the inter-packet propagation delay time difference $\Delta BB$ becomes near zero. For example, near zero is a constant range of $\Delta BB<0\pm\alpha$ centered around zero (where $\alpha$ is a threshold). The constant range $\alpha$ can be changed by removing only the influence of the cross traffic or by permitting the delay in the propagation delay time measuring apparatus 111. When the filtering is performed using the inter-packet propagation delay time difference $\Delta BB$, it is not necessary to set an absolute value of the threshold every time. The constant threshold $\alpha$ can correspond to any network.

Even in the combination of propagation delay times in which the inter-packet propagation delay time difference $\Delta BB$ becomes near zero, some sets of propagation delay times are influenced by the cross traffic. For example, there is a combination of propagation delay times influenced by the common cross traffic. Preferably the propagation delay time measuring apparatus 111 removes the combination of propagation delay times influenced by the common cross traffic.

FIG. 18 is an explanatory view illustrating an example of a method for extracting the propagation delay time that is influenced by the delay due to the cross traffic and the like. Assuming that one point is the combination of propagation delay times in which the inter-packet propagation delay time difference becomes near zero while zero point is the combination of propagation delay times in which the inter-packet propagation delay time difference does not become near zero, the point is added in each combination of propagation delay times. In FIG. 18, ○ denotes one point, and X denotes zero point. The propagation delay time whose point becomes more than a constant value is selected. For example, the propagation delay times $\Delta t1$ and $\Delta t3$ whose points become more than one are selected in the example of FIG. 16 in which m is set to three. The propagation delay time on which the cross traffic has the little influence can be measured by computing the propagation delay time again only from the selected propagation delay times $\Delta 1$ and $\Delta 3$.

Preferably the value of m is variable in the propagation delay time measuring apparatus 111 of FIG. 15. In the propagation delay time measuring apparatus 111, preferably the value of m in which the inter-packet propagation delay time difference concentrates on zero is obtained, and inter-packet propagation delay time difference is computed using the value of m. For example, when the value of m is increased to increase the total number of combinations of propagation delay times, the distribution of the inter-packet propagation delay time difference $\Delta BB$ becomes clear. The measuring packet that is not influenced by the cross traffic can be specified more correctly by determining whether the number of times in which the inter-packet propagation delay time difference $\Delta BB$ becomes near zero exceeds a constant value. The filtering is performed to the propagation delay time that is not influenced by the cross traffic from the inter-packet propagation delay time differences $\Delta BB$ of the combinations of propagation delay times in which the number of measuring packets ranges from one to m. The distribution of the inter-packet propagation delay time difference $\Delta BB$ becomes clear by changing the value of m, so that the propagation delay time measuring apparatus 111 can compute the propagation delay time that is not influenced by the cross traffic.

The propagation delay time measuring system of the present invention can be used to maintain and manage the communication network through which the packet communication is conducted. Particularly the propagation delay time measuring system of the present invention can be used to confirm a characteristic of the communication network or a connection status or to perform troubleshooting.

While the present invention has been shown and described with reference to particular embodiments, it will be understood by those skilled in the art that various changes in form and details may be made therein without departing from the spirit and scope of the invention.

REFERENCE NUMERALS

100: propagation delay time measuring system
101: propagation delay time measuring system
110: propagation delay time measuring apparatus
111: propagation delay time measuring apparatus
120: reply apparatus
130a, 130b: router
200: communication network
210: server
220: client
a, a1, a2, a3: measuring packet
b: last measuring packet
$\Delta T$: delay

The invention claimed is:

1. A propagation delay time measuring system comprising:
   a propagation delay time measuring apparatus that continuously transmits a plurality of measuring packets, a clock time of transmission being stored in the measuring packet; and
   a reply apparatus that sends back the measuring packets, transmitted from the propagation delay time measuring apparatus, to the propagation delay time measuring apparatus,
   wherein the reply apparatus sends back only the measuring packet, which is received within a predetermined time since the last measuring packet is received, to the propagation delay time measuring apparatus, the propagation delay time measuring apparatus receives the measuring packets sent back from the reply apparatus, and the propagation delay time measuring apparatus measures a propagation delay time between the propagation delay time measuring apparatus and the reply apparatus using at least one of the received measuring packets,
   wherein the propagation delay time measuring apparatus transmits m measuring packets, where $3 \leq m \leq$ "a total number of the continuously-transmitted plurality of measuring packets", measures the propagation delay time using the received measuring packets, and computes an inter-packet propagation delay time difference obtained by a difference between the measured propagation delay times, wherein a value of m is variable in the propagation delay time measuring apparatus, and wherein the propagation delay time measuring apparatus obtains the value of m in which the inter-packet propagation delay time difference concentrates on zero, and the propagation delay time measuring apparatus computes the inter-packet propagation delay time difference using the value of m, wherein m is an integer.

2. A propagation delay time measuring system comprising:

a propagation delay time measuring apparatus that continuously transmits a plurality of measuring packets, a clock time of transmission being stored in the measuring packet; and a reply apparatus that sends back the measuring packets, transmitted from the propagation delay time measuring apparatus, to the propagation delay time measuring apparatus, wherein the propagation delay time measuring apparatus measures a propagation delay time using only the measuring packet that is received within the predetermined time since the last measuring packet is received, wherein the propagation delay time measuring apparatus transmits m measuring packets, where $3 \leq m \leq$ "a total number of the continuously-transmitted plurality of measuring packets", measures the propagation delay time using the received measuring packets, and computes an inter-packet propagation delay time difference obtained by a difference between the measured propagation delay times, wherein a value of m is variable in the propagation delay time measuring apparatus, and wherein the propagation delay time measuring apparatus obtains the value of m in which the inter-packet propagation delay time difference concentrates on zero, and the propagation delay time measuring apparatus computes the inter-packet propagation delay time difference using the value of m, wherein m is an integer.

* * * * *